United States Patent [19]
Yachabach
[11] 3,764,752
[45] Oct. 9, 1973

[54] TELEPHONE LINE CARD SYSTEM

[75] Inventor: Jerry J. Yachabach, Lakeland, Fla.
[73] Assignee: Teltronics, Inc., Lakeland, Fla.

[22] Filed: Jan. 11, 1972
[21] Appl. No.: 216,978

[52] U.S. Cl. ................ 179/81 R, 179/84 A, 179/99
[51] Int. Cl. .............................................. H04m 1/00
[58] Field of Search ...................... 179/18 FA, 18 F, 179/99, 84 L, 84 R, 81 C

[56] References Cited

UNITED STATES PATENTS

| | | | |
|---|---|---|---|
| 3,566,044 | 2/1971 | Cross | 179/99 |
| 3,676,608 | 7/1972 | Goldthorp | 179/81 R |
| 3,637,939 | 1/1972 | Fabiano, Jr. | 179/18 ES |
| 3,647,983 | 3/1972 | Fitzsimons et al. | 179/99 |

*Primary Examiner*—Thomas W. Brown
*Attorney*—A. Yates Dowell, Jr.

[57] ABSTRACT

A telephone line card circuit including electrical devices and circuitry for minimizing the electrical components by providing an optical detector for controlling the input to an integrated circuit which in turn controls a multiple function relay operable as a line holding device and a visual and audible signal control device. This circuitry is particularly adapted for use in a key telephone system wherein a plurality of telephone sets are adapted to be selectively connected by an appropriate line key conventionally associated with a hand set, and this line card system includes a delay circuit to preclude dropout of a hold circuit due to line transients or line reversals. When a particular phone is connected to a particular telephone line through a key line button, provision is made for detecting this condition by another integrated circuit which controls a second relay operable for the control of a multiplicity of functions, such as controlling a visual signal for indicating that the circuit is in use, for controlling a line holding bridge, and for controlling the state of the first relay.

9 Claims, 2 Drawing Figures

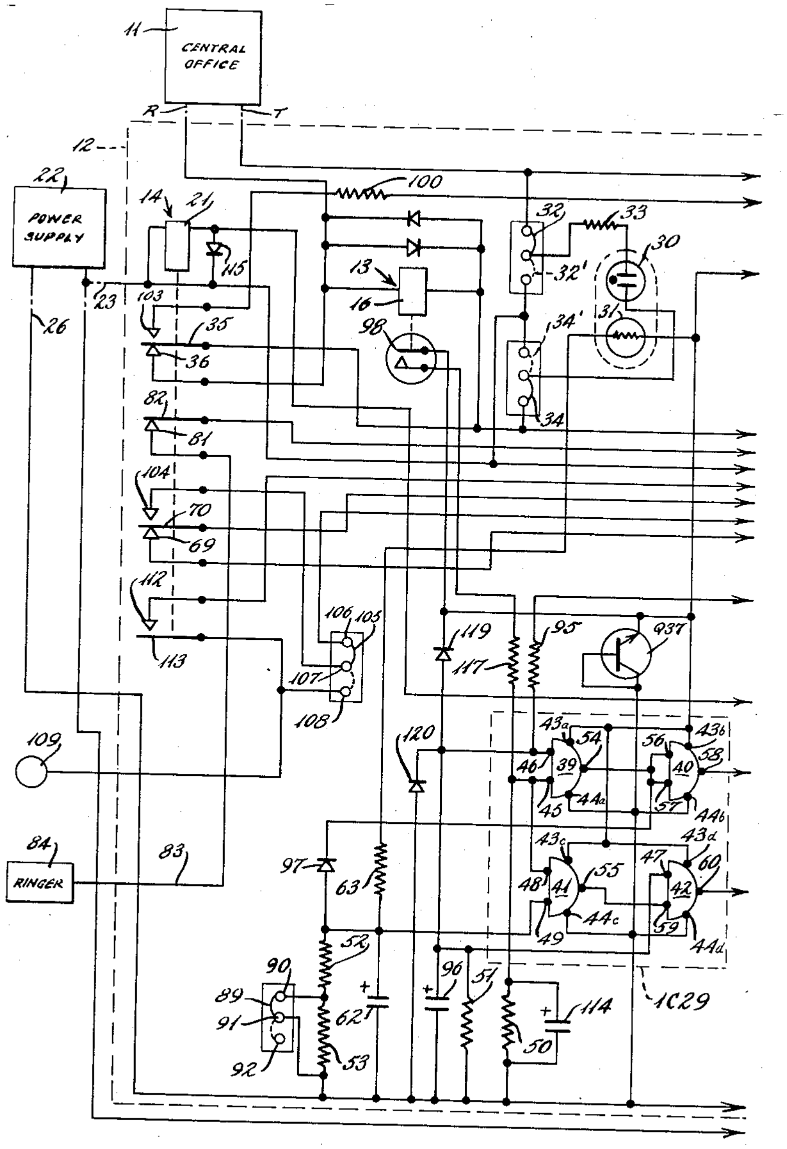
CENTRAL OFFICE
POWER SUPPLY
RINGER

PATENTED OCT 9 1973 3,764,752

SHEET 2 OF 2

TELEPHONE LINE CARD SYSTEM

FIELD OF THE INVENTION

This invention relates to telephone line systems, and more particularly to telephone control circuitry generally known as line circuits, and particularly usable with key telephone systems.

Telephone line circuits presently are employed to perform various control and supervisory functions incident to the establishment of a connection between a common switching point, such as a central office or PBX, and one or more telephone sets in a subscriber's premises. In a case of a line circuit serving a plurality of telephone sets in a key telephone system, the functions typically performed by the line circuit include signalling a particular subscriber station in response to a central office or PBX ringing signal, holding that line in response to manual key operation by a subscriber, indicating by means of visual or audible signals when a line is being called, held, or busy, timing out visual and audible signals when an incoming call which has been held is not answered, and originating and holding outgoing calls.

BACKGROUND OF THE INVENTION

In the past, relatively complex circuits and devices have been used in order to assure a very high degree of reliability in the operation of telephone circuits. Attempts have been made in the reduction of the complexity of the circuits and of the electrical devices controlling the circuits, but in many instances this has resulted in reduced flexibility and versatility of the circuitry, and, in other circumstances in the past, where the circuitry has been simplified, it has generally been at the expense of circuit reliability. In conventional key telephone systems, a ringing current from the central office energizes a relay which controls audible and visual signalling. If the line is answered, the relay is released and the audible and visual signalling is stopped. If the call is not answered, a time-out circuit which is common to a number of lines operates after a predetermined time interval to deenergize the relay.

Typical prior art patents in this field are illustrated by patents:

3,566,044 — Cross
3,598,924 — Zucher
3,539,732 — Weissenberg
3,582,562 — Sellari

SUMMARY OF THE INVENTION

An object of the invention is to reduce the number and complexity of components in telephone line circuits without sacrificing reliability or flexibility of performance, thereby minimizing line circuit installation and maintenance costs.

Another object of the invention is to provide a delay circuitry independent of electromagnetic relay characteristics which is settable to preclude drop-out of a hold line circuit due to line transients and line reversals.

A further object of the invention is to reduce the power requirements of telephone line circuits, primarily by employing integrated circuits and solid state devices to control relays in the performance of supervisory telephone functions.

The present improved circuitry and elements comprising the present invention are illustrated in a line circuit for a telephone key system in which the local signalling is made directly responsive to the reception of central office ringing current, utilizing a light source, such as a lamp and an optical detector. The optical detector controls the input state of an integrated circuit voltage level detector, which in turn controls a relay that controls multiple functions, such as a line holding device and a visual and audible signalling control device. Connection of a particular phone to a particular line is performed in the conventional manner by lifting the hand set and depressing the appropriate line key button. This condition is detected by an integrated circuit, which in turn controls a second relay, which is adapted to control a multiplicity of functions including a visual signal display, a line holding bridge, and the energization of the first above-mentioned relay. In addition, a light emitting diode is used in the telephone line circuit to provide continuous visual indication that a line is in use. Furthermore, operation of the telephone set line holding key is sensed by an integrated circuit which controls two relays which in turn connect a holding bridge across the line in lieu of the desired telephone set.

Further objects and advantages of this invention will be apparent from the following description referring to the accompanying drawings, and the features of novelty which characterize this invention will be pointed out with particularity in the claims appended to and forming a part of this specification.

DETAILED DESCRIPTION OF THE INVENTION

Figure 1:
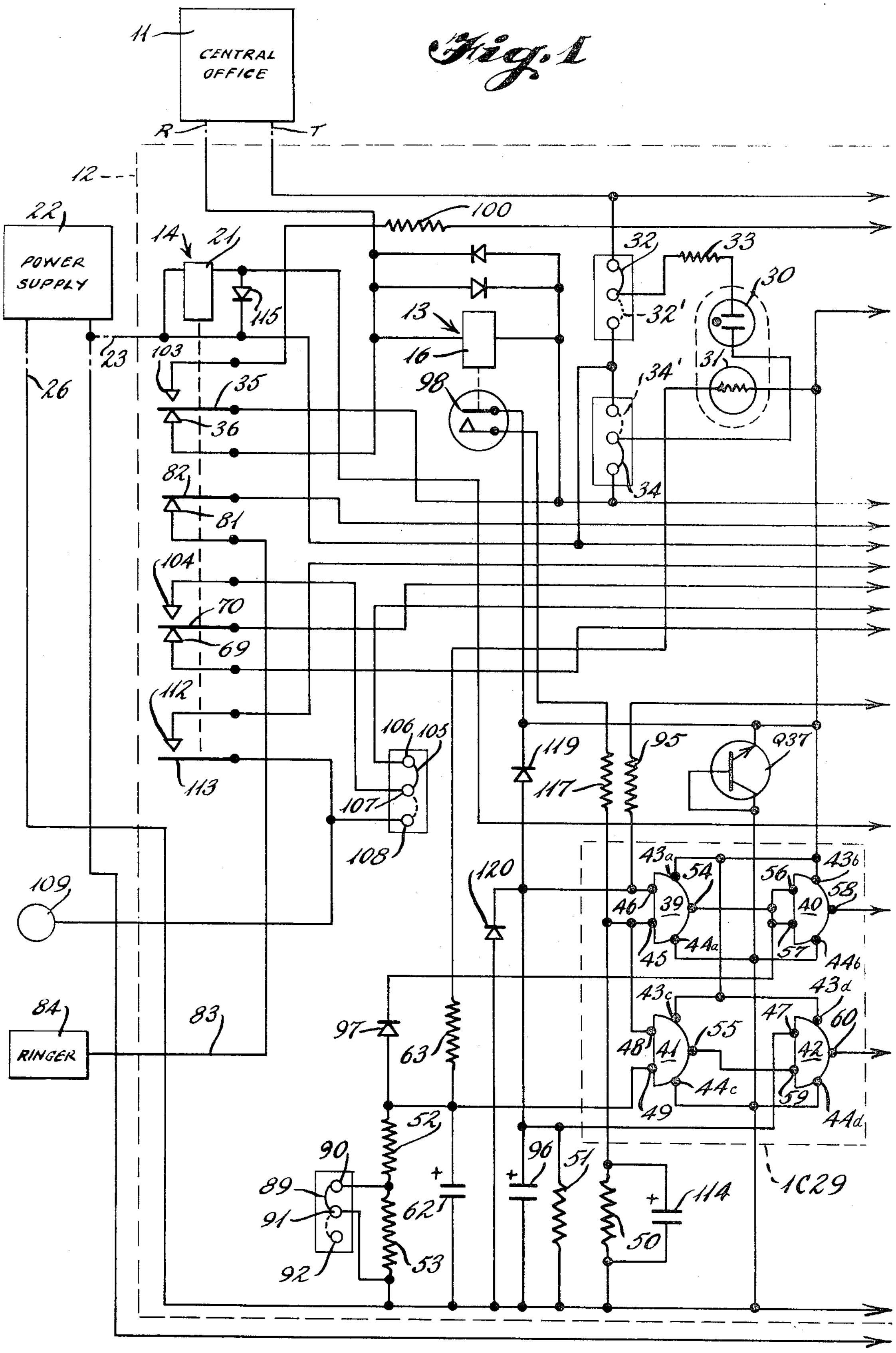
FIG. 1 is a schematic circuit diagram illustrating part of the circuitry of an embodiment of the present invention particularly adapted to a line card circuit for a key telephone system.

The telephone system illustrated in the drawings shows a telephone subset which may be one telephone of a plurality of subscribers' sets in a key telephone system. This subset 10 is shown connected over conventional tip and ring lines T and R, respectively, through a remote central office 11, which may also be a PBX. Between the central office 11 and the telephone set 10, a key system line card 12 is arranged which comprises an embodiment of the present invention.

The precise interrelation and connections of the various circuit components will be more readily understood from a consideration of the detailed circuitry and its operation under varying conditions, such as when there is an incoming call, a time-out of a ringup, an answering of an incoming call, an outgoing call, the holding of a call, and the release of a hold by a phone station and also from a central office or a PBX.

INCOMING CALL

In the illustrated line card system, three relays 13, 14, and 15 are utilized to provide the major circuit reconnections controlling the operation of the system. When a telephone subset 10 is in the on-hook idle circuit position, all of the relays 13, 14, and 15 are deenergized. The relay 13 is operable by energization of its coil 16 which is connected to the ring line R from the central office 11 and through a pickup key 17 and a switch hook 18 of the telephone subset 10 and through another switch hook 19 and pickup key 20 to the tip line T, which completes the circuit to the central office 11. The relay 14 is adapted to be operated by energization of its coil 21, which is connected to the positive side of a 24-volt key system power supply 22 through a line 23, and is controlled by a transistor 24 and a light emitting diode 25 to the negative side of the power supply 22 through a line 26. The relay 15 is operable by the energization of its operating coil 27, which is connected to the positive side of the power supply 22 through line 23 and to the negative side of the power supply 22 through a transistor Q 28 and power supply line 26. In the on-hook idle circuit condition of the telephone set 10, relay 13 coil 16 is deenergized as the telephone switch hooks 18 and 19 are opened. In like manner, the relay coils 21 and 27 are deenergized under this condition as the respective series connected transistors Q 24 and Q 28 are nonconducting during this condition due to the bias voltage on the respective bases of these transistors. These bias voltages are controlled by an integrated circuit IC 29, which is responsive to operation of the relay 13.

A condition indicating lamp 30 of a light response sensitive device, including a light sensitive resistor or other solid state photoelectric device 31, also is connected to the central office tip line T through a jumper 32 and a current limiting series resistor 33. For certain other purposes to be explained later, the lamp 30 may be connected by the jumper 32 to a terminal 32', which will connect the lamp 30 through line 23 to the positive side of the power supply 22. The other side of the lamp 30 is connected through a second jumper 34 to the telephone subset 10 through the series connected pickup keys 17 and 20 and the switch hooks 18 and 19 which connect this other side of the lamp also to the tip line T. Since this circuit through the subset is open from the lamp 30 to the tip line T when the telephone set is hung up, the lamp 30 is not substantially shortcircuited. The same side of the lamp 30 which is connected through the jumper 34 to the telephone subset 10 also is connected through the jumper 34 to contactor 35 of relay 14, which, in the deenergized condition, is in engagement with a contact 36 connected to ring line R. Under the idle or nonenergized circuit condition, the lamp 30 is thus deenergized and the light sensitive resistor 31 is desensitized and has its substantially maximum resistance, which may suitably be approximately 10 megohms.

A transistor Q 37 has its emitter connected through a resistance 38 and the line 23 to the positive side of the power supply 22, such that it is at a more positive voltage than the transistor Q 37 base or collector, which are connected together and through the line 26 to the negative side of the power supply 22. This places the transistor Q 37 in a conducting mode of operation and it acts as a zener diode voltage regulator, which, in this instance, can conveniently be adjusted to be maintained at an illustrative value of 6 volts. This voltage regulation is utilized by the integrated circuit IC 29, which may conveniently comprise, for illustrative purposes, a complementary metal oxide silicone semiconductor circuit.

This integrated circuit IC 29 comprises four identical logic circuits or gates 39, 40, 41, and 42, each of which has two inputs and one output and functions as a multiple input logic element. Each of these gates also has a positive reference or bias voltage connection 43*a–d* connected to the positive side of the power supply 22 through line 23, and a negative reference or bias voltage connection 44*a–d* which is connected to the negative side of the power supply 22 through line 26. Each of the logic circuits 39, 40, 41, and 42 has an input impedance of approximately $10^{12}$ ohms, illustrative magnitude, and an output impedance of approximately 250 ohms, illustrative magnitude. Each of these logic circuits operates as an OR gate when either of the two inputs is at a voltage above 50 percent, illustrative magnitude, of the bias voltage across the connections 43*a–d*, 44*a–d*. This is defined as a logical 1 input for which the responsive logical output will be equivalent to a 250 ohm, illustrative magnitude, resistance to the negative bias gate connection 44*a–d*, which may be termed a logical 0 output. Conversely, when the voltage on both inputs to a particular logic circuit 39, 40, 41, or 42 is below 50 percent, illustrative magnitude of the bias voltage applied to a respective gate, which may be defined as a logical 0 input, the respective gate acts as an AND gate and its logical output will appear as a 250 ohm, illustrative magnitude, resistance to the respective gate positive bias connection 43. This can be defined as a logical 1 output.

In the previously described on-hook idle state of the telephone system, the integrated circuit IC 29 input connections 45, 46, 47, 48, and 49 are at a substantially minus 24 volts of the power supply 22. This is provided by the connection of the gate inputs 45 and 48 through a resistance 50, the gate inputs 46 and 47 through a resistance 51, and the gate input 49 through a variable resistance comprising two series connected sections 52 and 53, all of which are connected to the negative side of the power supply 22 through line 26, so that all of these inputs as previously defined are at logical 0 state. Thus, the output 54 of gate 39 and the output 55 of gate 41 are at logical 1 states. Gate input connections 56 and 57 of gate 40 are both connected to output 54 of gate 39, and in the above logical 1 state of output 54 both of these inputs 56 and 57 are in the logical 1 state so that output gate 40 output connection 58 is in the logical 0 state.

Figure 1A:
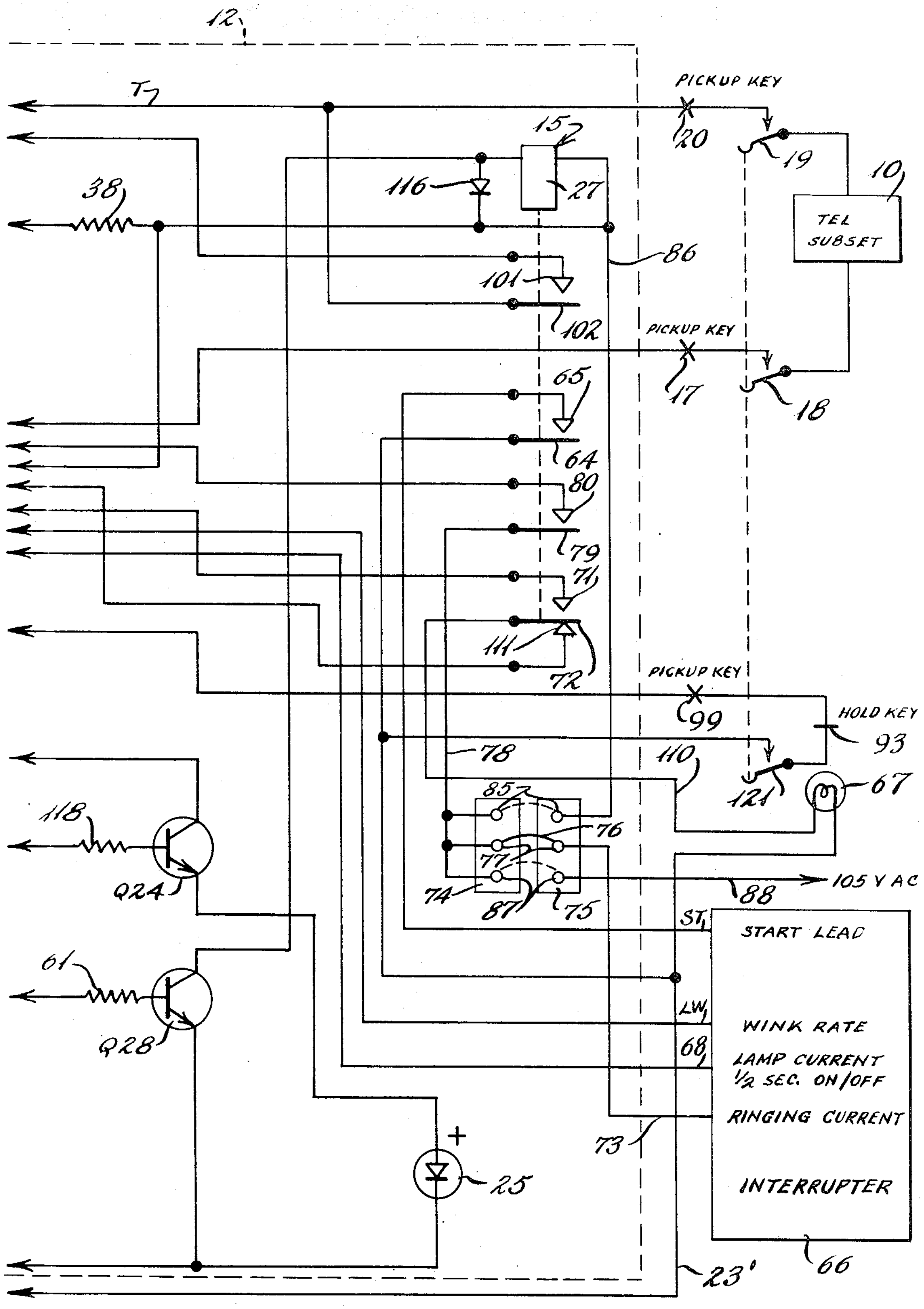
FIG. 1*a* is a schematic circuit diagram illustrating the remainder of the illustrative embodiment of the invention shown in FIG. 1.

Since the gate 40 output connection 48 is connected to the base of transistor Q 24, this transistor is nonconducting for this state of the system. With the previously assumed on-hook condition of the telephone subset 10 and the resultant conditions of the connections to the integrated circuit 29, the gate 41 output connection 55 is in a logical 1 state, so that the gate 22 input connection 59 also is in the logical 1 state, as it is connected to the gate 41 output connection 55. As previously explained, this logical 1 input to gate 42 results in a logical 0 state of the output connection 60 of gate 42. This gate 42 output connection 60 is connected through a resistor 61 to the base of the transistor Q 28 which, in this condition, therefore holds this transistor in a nonconducting state. Since the transistor 24 is nonconducting in this on-hook condition of the telephone 10, the relay 14 coil 21 is deenergized and its various contactors are as shown in FIG. 1. Similarly, since transistor 28 is nonconducting for this on-hook condition of the telephone set 10, the relay 15 coil 27 is deenergized and its respective contactors are in the position shown in FIG. 1*a*.

When there is an incoming call to subscriber's telephone set 10, ringing current is applied to the connecting line from the central office 11 or from a PBX, and the line card 12 must detect this alternating current ring signal and properly transmit it to the telephone set bell. The ring signal path is determined by connections in the central office and these paths conventionally could be any of three options, namely from tip lead T to ring lead R bridged by a conventional ringing connection, from tip line T to ground, or from ring line R to ground. These three options may be set with jumper circuits including jumpers 32 and 34 on the line card 12 to provide for the proper ringing circuit of the telephone set 10 in accordance with the option of the central station or PBX ringing circuitry the optional jumper connections in the line card 12 are made such that the ringing voltage supplied from the central station or PBX will ignite the neon lamp 30 so that it converts the ringing current and emits a light energy signal which is detected by the light sensitive resistor 31, whereby the resistance of the resistor 31 is reduced from about $10^7$ ohms to 2,000 ohms, illustrative magnitude, thereby providing a relatively low resistance current conducting circuit. The light sensitive resistor 31 connects a capacitor 62 across the power supply 22 through the negative line 26 and to the power line 23 through the resistance 38 and a resistor 63, which is connected between the capacitor 62 and the resistance element 31. The great reduction in the resistance of the resistor 31 due to the light energy from the neon light 30, provides for effectively detecting the ringing current from the central office and under this condition, permits the charging of the capacitor 62 to a voltage nearly equal to the positive bias voltage on the transistor Q 37 emitter and on the integrated circuit IC 29 gate bias connections 43. As the charge on capacitor 62 rises, the voltage on gate 41 input 49 is directly similarly increased. As the voltage on the input 49 passes through the 50 percent illustrative magnitude threshold voltage level, it becomes a logical 1 as the input to the gate 41. As a result of this, the gate 41 output 55 changes from a logical 1 to a logical 0 state, and since this output is electrically connected to gate 42 input 59, this input also changes to a logical 0 state. Gate 42 input 47 already was in a logical 0 state and therefore gate 42 output 60 changes to a logical 1 state, which imposes a positive potential on the base of the transistor 28 through the resistor 61 and causes transistor 28 to become conductive. This provides an energizing circuit for relay 15 coil 27 from the power supply 22 through line 23, coil 27, transistor 28 collector to emitter, to power supply line 26. Relay 15 is thus actuated, and, inter alia, closes contacts 64–65 and applies ground or positive power supply potential to a start lead ST which connects to a conventional interrupter 66 and to a ground line 23'.

The application of ground to the interrupter 66 circuit by way of the start lead ST is used to start a motor, not shown, for the interrupter which controls various conventional interrupter cycles. The interrupter 66 and the power supply 22 are shown in block form as such equipment does not form part of this invention and is of suitable conventional design. The interrupter 66 typically comprises motor driven cams which operate contacts to provide desirable interruption rates for both visual and audible signalling. Interruption lamp current for a conventional station signalling lamp 67 is supplied from the interrupter through a line 68, contacts 69–70 of relay 14, and contacts 71–72 of relay 15 connected to one side of signal lamp 67, the other side of which is connected to ground line 23' of the power supply 22. A suitable typical interruption rate for the lamp current provides for one-half second on-off flashing.

Ringing current can be applied from the interrupter 66 by way of a line 73 through option connectors 74–75 if a jumper 76 connects the terminals 77 on the connectors 74–75. With this option connection, ringing current passes through the interrupter connector terminals 77, line 78, relay 15 contacts 79–80, relay 14 contacts 81–82, through line 83 to a local bell or similar device 84. If a common direct current audible ringing option is desired, the connector jumper 76 is placed on the connectors 74–75 so as to connect together the connector terminals 85, and, in this optional position, disconnects the circuit between the terminals 77. This provides an energizing circuit to the bell 84 through the relays 14 and 15, as in the previous option, except that the current, instead of coming from the interrupter 66 through line 73, is supplied to the connector 75 terminal 85 over a line 86 connected directly to the power supply positive line 23.

If a steady audible ringing option is desired, the jumper 76 is disconnected from the connector terminals 77 and 85 and is connected across the connectors 74–75 through terminals 87. This again connects the bell 84 through the same circuit as previously described up to the connector 74 from which it is connected through the jumper 76 to the connector 75 terminal 87 which is connected by a line 88 to a suitable alternating current voltage, which may be 105 volts.

TIME-OUT OF RING-UP CIRCUIT

The voltage across capacitor 62 before a ring is detected is determined by a voltage divider ratio which can be varied by a jumper 89, which can be connected across terminals 90–91 or 91–92, so as to shunt out or alternately insert resistor 53 in series with resistor 52 across the terminals of the capacitor 62. These resistors 53 and 52 form part of a voltage divider with resistor 63 and light sensitive resistor 31. The voltage divider ratio which is effective as the potential across the capacitor 62 can thus be composed of resistor 63 + resistor 31/resistor 52 + resistor 63 + resistor 31 or alternatively resistor 63 + resistor 31/resistor 52 + resistor 53 + resistor 63 + resistor 31, depending upon the time-out option which is desired and which is determined by the position of the jumper 89.

This potential across the capacitor 62 also is dependent upon the voltage of the transistor Q 37 emitter with respect to its collector, since this transistor regulates the overall voltage applied to the voltage divider.

The voltage across the capacitor 62 typically is 1/10th volt prior to a ring detection and it increases to approximately 95 percent of the voltage across the transistor Q 37 during a typical ring cycle. The resistor 63 is primarily used to reduce the charge rate of capacitor 62, so as to preclude flash triggering of the gates of the integrated circuit 29 due to line transients, which might be detected by and light the neon lamp 30.

When the central office ringing stops, the capacitor 62 discharges through resistor 52 or resistor 52 in series with resistor 53. The effect of the remainder of the voltage divider in the discharge of capacitor 62 is relatively negligible, as when there is no ringing current from the central station the neon lamp 30 is not lighted and the resistance of the resistor 31 then is about thirty times greater than the resistance of resistor 52 + resistor 53, so that the effect of resistor 31 and resistor 63 is very small for this condition of operation. The effect of the integrated circuit 29 through the input 49 of gate 41 on the discharge of the capacitor 62 also is negligible, since the resistance therethrough is substantially $10^7$ times higher than the combined resistance of resistors 52 and 53.

When ringing stops and capacitor 62 discharges and the capacitor voltage decreases to 50 percent of the gate 41 biasing voltage, gate 41 input 49 interprets the capacitor discharge voltage as a change in the logical state from a 1 to a 0, whereby its output 55, and therefore gate 42 input 59, become logical 1. This also results in the gate 42 output 60 being logical 0, thereby removing the base bias voltage from transistor Q 28. This makes the transistor Q 28 nonconductive, so that the relay 15 coil 36 is deenergized, and relay 15 returns to the position shown in FIG. *1a*.

The time constant of resistor 52 and capacitor 62 is typically made such that time-out occurs in 6 seconds. The time constant of resistor 52 + resistor 53 and capacitor 62 is typically made such that the time-out occurs in 12 seconds. Thus the time-out can be set by the position of jumper 89 across terminals 90–91 for a short time-out and in a position across terminals 91–92 for a long time-out.

In this improved, simplified card line circuit there need not be any electrical connection of any type between the tip and ring telephone lines T and R and the circuits connected thereto with the key system control electronics, except for strapping options. This greatly reduces the possibility of lightning transients on telephone lines from causing key system component failure due to surge voltages. This is extremely important in solid state electronics, as present solid state units, such as transistors, certain diodes, and gates of integrated circuits, are extremely susceptible to damage and destruction due to overvoltage surges thereon. All known prior art related to the ring detecting function of such systems has had electrical connections from tip and ring circuits to the key system electronics and therefore has been very lightning sensitive.

ANSWERING AN INCOMING CALL

An incoming call to a telephone utilizing the present invention is answered in the conventional manner by operating a pickup line key 99, 17 and 20, which is associated with the line being rung, and by removing the handset of the telephone set 10 from its mounting, thereby closing the hook switches 18, 121 and 19. Closure of this hook switch 121 extends ground potential over pickup key 99, normally closed hold key 93, and line 94 to resistor 95 of the key system line card. The resistor 95 functions as a current limiting resistor to protect the line card circuitry.

Ground or positive power supply potential on line 94 of the line card causes the voltage on the plus side of a capacitor 96 to increase until the gate inputs 46 and 47 of gates 39 and 42, respectively, change from a logical 0 to a logical 1. When this occurs, the gate output 54 of gate 39 changes to logical 0 and the gate output 58 of gate 40 changes to logical 1. This impresses a biasing voltage on the base of transistor Q 24, so that this transistor becomes conductive and completes a circuit across the power supply 22 through the light emitting diode lamp 25 and the relay 14 coil 21, thereby energizing this coil and actuating the relay 14.

Concurrently therewith, gate 42 output 60 changes to a logical 0 state, thereby removing the biasing voltage on the base of transistor Q 28, so that it becomes nonconducting and deenergizes relay 15 coil 27. During this operation when gate 39 output 54 changes to the logical 0 state, a diode 97 becomes forward biased with respect to gate 41 input 49, and the capacitor 62, which has been charged by the ring detect circuitry, including the light sensitive resistor 31, is discharged through the diode 97 and gate 39 output 54 to the negative bias voltage connection **44*a–d*, and through it to line 26. Discharging of capacitor 62 is required in order to prevent a hold condition from occurring if the handset is placed off-hook and quickly back on-hook. When relay 14 coil 21 is energized, its contacts 35 and 36 open a shunt circuit across relay 13 coil 16 which allows coil 16** to become energized when answering an incomming call as described above or when placing a call on hold as described infra.

Energization of relay 13 closes its contacts 98, thereby placing a logical 1 input on gate 39 input 45 and gate 41 input 48. This causes gate 39 output 54 and gate 41 output 55 to become logical 0 levels, so that gate 40 inputs 56 and 57 become logical 0 and its output 58 becomes logical 1. This places a positive bias on the base of transistor Q 24, so that it becomes conductive, thereby providing an energizing circuit for relay 14 coil 21. Concurrently, when the gate 41 output 55 becomes logical 0, the gate 42 input 59 also becomes logical 0, so that the output 60 of gate 42, and therefore the bias on the base of transistor Q 28, depends upon the logical state of input 47 to gate 42, which will be explained later with reference to the holding operation of this system.

OUTGOING CALLS

The procedure for making an outgoing call is the same as that for answering an incoming call except that the ring detecting circuitry is in an idle or deenergized state, and relay 15 is deenergized at the time that the handset is lifted, and pickup key 17–20–99 is then manually depressed.

HOLDING

An incoming or outgoing call can be held by operating the hold key 93. This key is manually operated so that when it is depressed its contacts open the ground circuit which was extended to the line card through line 94 and pickup key 99. When the hold key 93 is depressed, pickup key 20 is unaffected and therefore pickup key 20 also is still depressed and tip-ring loop current continues to flow so as to energize relay 13 coil 16 and telephone set 10. With relay 13 energized, relay 14 coil 21 is held energized regardless of the input condition of line 94. The reason for this is that the logical 1 state on gate 39 input 45 causes gate 39 output 54 to be logical 0 regardless of the logical state of gate 39 input 46.

With the input 48 to gate 41 in a logical 1 state, the output 55 of gate 41 is in the logical 0 state, so that the gate 42 input 59 is also in the logical 0 state. When the gate 42 input 59 is in the logical 0 state, the logical level of the gate 42 output 60 will be the complement of the logical level of its input 59. When line 94 input is open circuited, input 47 to gate 42 drops to a logical 0 level, transistor Q 28 becomes conductive, thereby energizing relay 15 coil 27.

With relay 15 energized and relay 14 still energized, as explained above, a line holding bridge resistor 100 is connected to the tip line T through contacts 101 and 102 of relay 15, and through contacts 35 and 103 of relay 14, through relay 13 coil 16 to the ring line R forming a holding bridge circuit. With resistance 100 across tip and ring, the hold key 93 can be manually released. Manually releasing the hold button mechanically disengages the line pickup key 20. This action removes telephone subset 10 from the phone line, and the line is held until a subset is connected to the line by lifting such handset and manually depressing the appropriate line pickup key or until the phone line is opened at the central office.

Ground is supplied to interrupter 66 by way of line 23', relay 15 contacts 64 and 65, and start line ST, which starts or continues the signal interrupter operation. The electrical circuit for the station lamp 67 is completed through relay 15 contacts 71 and 72, relay 14 contacts 70 and 104, and option jumper or bridge 105 which is set to connect option terminals 106 and 107, to wink line LW, and then to the wink lamp contacts of the interrupter 66. Jumper 105 also can be set to connect option terminal 107 to terminal 108, as indicated by the dotted line in FIG. 1, in order to provide a steady lamp operation of the lamp 67 during a line hold, if this is desired. The circuit for this latter lamp operation is completed through relay 15 contacts 71 and 72, relay 14 contacts 70 and 104, the option jumper 105 set to connect terminals 107 and 108, which energize the light from a power source 109.

RELEASE OF HOLDING BRIDGE BY STATION

Any station of the key telephone system may seize or connect to a hold line by manually operating the appropriate pick-up key with its handset off the hook, as described in the previous section on answering an incoming call. This removes the holding bridge resistor 100 from its connection across the line by the deenergization of the relay 15, which thereby opens its contacts 101 and 102. Uninterrupted operation of the station lamp 67 is provided by a circuit to this lamp through line 110 which connects it to relay 15 contact 72 which closes a circuit with relay 15 contact 111 for this deenergized position of the relay, and through relay 14 contacts 112 and 113, which again connect the lamp to the power source 109 for this operating condition.

RELEASE OF HOLDING BRIDGE FROM THE CENTRAL OFFICE OR PBX BY AN OPEN CIRCUIT LINE

In the event that a hold party abandons the call by hanging up, the line circuit can be released from the connecting switching equipment by providing a momentary interruption of line current in the central station. This provides for the deenergization of relay 13.

In addition, integrated circuit 29 gate logical levels are changed so that gate 39 input 45 and gate 41 input 48 become logical 0, and, with the integrated circuit IC 29 gate inputs 46, 47, and 49 at a logical 0 level, gates 39 and 41 outputs both become logical 1 such that both inputs 56 and 57 of gate 40 are a logical 1 and its output is logical 0, thereby rendering transistor Q 24 nonconductive.

Similarly, with both inputs 48 and 49 at logical 0, gate 41 output 55 becomes logical 1, so that gate 42 input 49 becomes logical 1, and its output 60 becomes logical 0. This renders transistor Q 28 nonconductive and deenergizes relay 15.

With both relays 14 and 15 deenergized, the line circuit is returned to its idle state. The line interruption time required to release relay 13 is substantially independent of its electromechanical characteristics but is a function of the time constant of resistor 50 and a capacitor 114. This time constant is set such that undesired line transients, noise spikes, line levels, and lightning are not misinterpreted as open circuit lines.

Diodes 115 and 116 are respectively connected across coils 21 and 27 of relays 14 and 15 in order to expedite the deenergization of these relays by discharge therethrough when the coil circuits are opened. A current limiting resistor 117 is connected between relay 13 contacts 98 and capacitor 114, respectively, for limiting the current flowing to these relay contacts to prevent possible damage thereto. A resistor 118 is connected between output 58 of gate 40 and the base of transistor Q 24 also to function as a current limiting resistor. Diodes 119 and 120 are respectively connected to input 46 of gate 39 in order to assure against possible undesired reversed potentials thereon, which might cause damage to the integrated circuit.

While a particular embodiment of this invention has been illustrated and described, modifications thereof will occur to those skilled in the art. It is to be understood, therefore, that this invention is not to be limited to the exact details disclosed.

I claim:

1. In a telephone line circuit having a key system local ringing means, means responsive to a ringing current from a remote location for initiating the operation of said local ringing means, said initiating means including means responsive to said ringing current for emitting light energy by conversion of said ringing current to light energy, means responsive to said light energy for detecting the presence of said light energy, a capacitor, a power source, means including said light detecting means for providing a current conducting circuit to said capacitor from said power source for charging said capacitor to a predetermined threshold voltage, circuit interrupter means including a source of local ringing current, and means responsive to buildup of an electrical charge to said threshold voltage by said capacitor connected for establishing a current path between said interrupter and said local ringing means, said means for establishing a current path comprises an array of integrated circuit gates responsive to said buildup of charge and a pair of relays responsive to said array of gates, said relays having a plurality of contacts which connect said local ringing means to said source of local ringing current.

2. A telephone line circuit as defined in claim 1 wherein said light energy conversion means includes a neon lamp and a current limiting resistor.

3. A telephone line circuit as defined in claim 1 wherein said light detecting means includes a light sensitive resistor.

4. A telephone line circuit as defined in claim 1 wherein said detecting means comprises a light sensitive solid state device.

5. A telephone line circuit as defined in claim 1 wherein said means responsive to buildup of an electrical charge to a predetermined threshold level includes an integrated circuit threshold detector, said integrated circuit having a multiple input logic element with an output connected for controlling the establishment of said current path between said interrupter and said local ringing means.

6. A telephone line circuit as defined in claim 5 including a first and a second multifunction relay each having an operating coil, a first transistor for controlling energization of said first relay coil, one of said integrated circuit inputs to said multiple input logic element being responsive to detection of light by said light detecting means for providing an output controlling said first transistor for energizing said first relay coil in response to ringing current energization of said light emitting means, said first relay having contacts for providing an energizing circuit to said interrupter for establishing said current path, whereby said local ringing means is operatively connected to said source of local ringing current.

7. A telephone line circuit for a key telephone system having tip and ring lines and including a local subscriber's telephone line and a telephone set, local ringing means, means connected for response to ringing current from a remote location for initiating the operation of said local ringing means, means connected for response to termination of said ringing current for disabling said local ringing means, means including a hold key for holding said subscriber's line, and means for indicating at said local line circuit that a subscriber's line is in use or on hold, a pair of relays, said local ringing initiating means and said holding means each including contacts on said pair of relays, said pair of relays responsive to and energized by an array of integrated circuit gates.

8. A telephone line circuit as defined in claim 7, wherein said telephone set has a pickup key, a third relay having an operating coil connected in series with said telephone pickup key, said pair of relays having contacts for connecting said third relay coil in a holding bridge circuit across said tip and ring lines when said telephone set is in off-hook position and said pickup key is closed and for maintaining said holding bridge circuit and third relay coil energized by tip and ring loop current irrespective of subsequent opening of said hold key until a telephone set pickup key is closed or the tip and ring lines are deenergized.

9. Apparatus as in claim 7 wherein said local ringing means comprises means responsive to said ringing current for emitting light energy by conversion of said ringing current to light energy and means responsive to said light energy for detecting the presence of said light energy to produce an initiating signal.

* * * * *